F. H. VAN HOUTEN, Jr.
SPRAYING APPARATUS FOR DOUGH DIVIDERS.
APPLICATION FILED AUG. 3, 1915.

1,181,415. Patented May 2, 1916.

Inventor
M. Frank H. Van Houten Jr.
By
Attorneys

UNITED STATES PATENT OFFICE.

FRANK H. VAN HOUTEN, JR., OF BEACON, NEW YORK, ASSIGNOR TO DUTCHESS TOOL COMPANY, OF BEACON, NEW YORK, A CORPORATION OF NEW YORK.

SPRAYING APPARATUS FOR DOUGH-DIVIDERS.

1,181,415.   Specification of Letters Patent.   Patented May 2, 1916.

Application filed August 3, 1915. Serial No. 43,414.

*To all whom it may concern:*

Be it known that I, FRANK H. VAN HOUTEN, Jr., a citizen of the United States, residing at Beacon, in the county of Dutchess and State of New York, have invented certain new and useful Improvements in Spraying Apparatus for Dough-Dividers; and I do hereby declare the following to be a full, clear, and exact description of the same, reference being had to the accompanying drawings, forming a part of this specification, and to the figures and letters of reference marked thereon.

This invention relates generally to an improved arrangement for spraying the measuring pockets of a dough dividing machine after the dough has been discharged and before the return of the pockets to filling position.

In dough dividing machines of the type to which the present improvements are especially applicable, a movable head having measuring pockets is provided, and the pockets are successively moved into registry with a compression chamber from which the dough is fed, preferably by a plunger which positively forces the dough into the pockets. Within each of the pockets is a plunger which is retracted for the admission of a new charge of dough and advanced to discharge the dough from a pocket when it has been moved out of registry with the compression chamber. Machines of this type have embodied a number of different mechanical arrangements of parts, and for illustrating the present invention, I have adopted a machine having a rotary cylindrical measuring head of the general type illustrated in my co-pending application, Serial No. 868,286, filed October 23, 1914.

The object of the present invention is the provision of an improved arrangement for automatically spraying the interior of the measuring pockets, such as are embodied in a measuring head of the above type, when the dough has been discharged and before the return of the pockets to filling position.

A full understanding of the invention will be attained from the ensuing detailed description when taken in connection with the accompanying drawings which illustrate a construction embodying the same in a preferred form, and the novel features of the invention will be specifically pointed out and specified in the appended claims.

Figure 1:
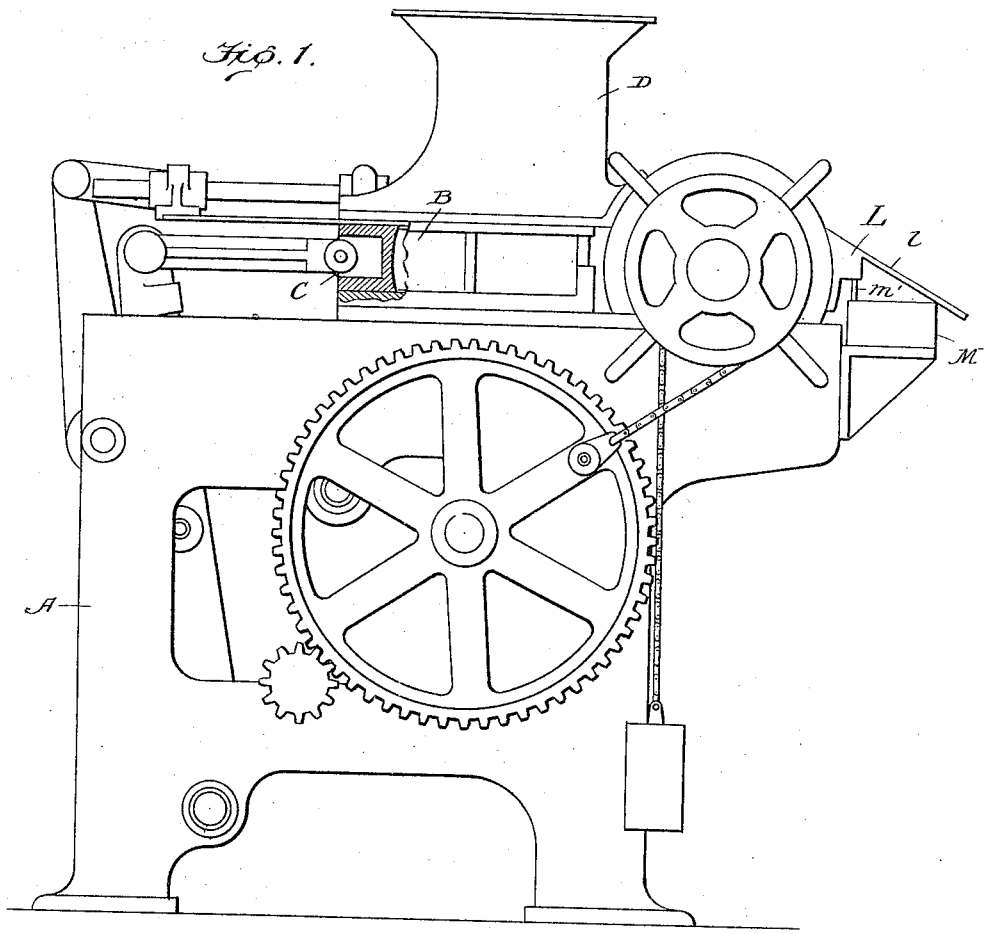
Figure 2:
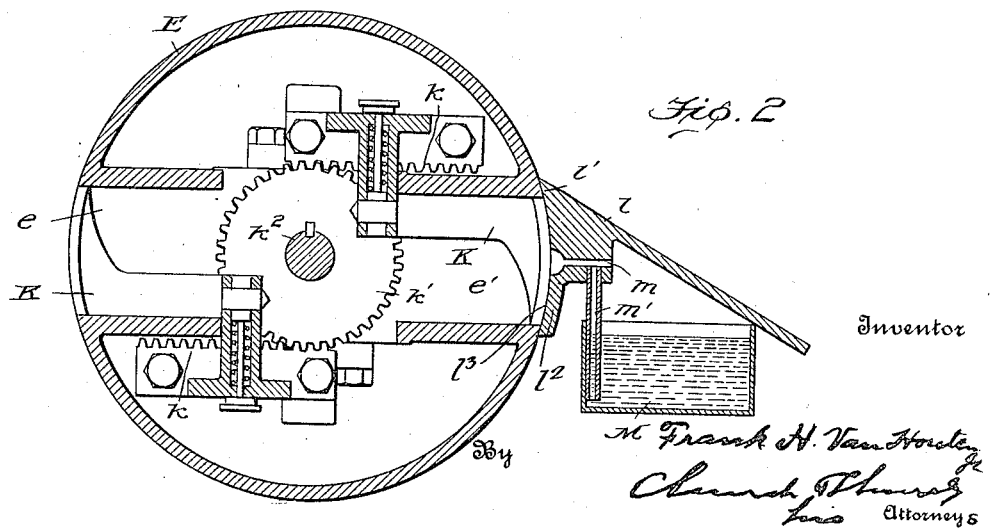

In the drawings:—Figure 1 is a side elevation of one type of dough dividing machine embodying the present improvements. Fig. 2 is a transverse section through the dough measuring cylinder, illustrating in detail the novel spraying arrangement.

Like characters of reference in the several figures indicate the same parts.

The frame of the machine is indicated generally at A and located in the upper portion of the frame is the compression chamber B in which operates a reciprocatory plunger C. Above the path of the plunger is located a hopper D, the lower end of which communicates with the compression chamber and through which dough is fed by gravity into the compression chamber in advance of the plunger. The plunger C operates to force the dough with an even pressure into the pockets $e$, $e'$ of the rotary cylindrical measuring head E, when the pockets are successively rotated into registry with the discharge end of the compression chamber. Head E is suitably journaled in bearings in the frame and rotated intermittently to bring the pockets into and out of registry with the compression chamber. Means for imparting such intermittent rotation of the measuring head is fully described in my prior Patent No. 788,123, issued to me April 25, 1905, and consequently a detailed description will not be here given. Suitable means, such as the general type illustrated in my said prior patent, is provided for effecting reciprocatory movement of the plunger, and such movement will be timed so that a forward thrust will be imparted to the plunger only when a dough receiving pocket is in registry with the compression chamber B. The dough in the compression chamber is advanced by the plunger with a uniform pressure, and the measuring pockets will as a consequence be filled uniformly with dough of equal density.

Each of the measuring pockets $e$, $e'$ in the measuring head or cylinder E, is provided with a plunger K and said plungers are operated to advance during movement of cylinder E and discharge the dough from the pockets as they successively arrive at a point above the scraper L. The plungers are simultaneously retracted or adapted to retreat in front of the advancing dough into pockets $e$, $e'$, when a pocket $e$, for instance, is in registry with compression chamber B. The preferred arrangement for retracting and advancing the plungers K is that of my co-pending application, Serial No. 868,286, filed October 23, 1914, the said arrangement being partly illustrated in Fig. 2 of the drawing. As shown each plunger K is provided with a rack $k$ in mesh with a pinion $k'$ on a shaft $k^2$. This provides an arrangement whereby the plungers may be simultaneously retracted for when a pocket $e$ is in registry with the compression chamber and the pressure of the incoming dough is forcing the plunger K into the pocket, the inward axial movement of rack $k$ rotates pinion $k'$, thereby transmitting an inward axial movement to the plunger K in the other pocket $e'$. Means is provided for simultaneously advancing the plungers to force the dough out of the pockets, as the rotation of the cylinder E successively moves the pockets to discharging position, a preferred arrangement being found in my said co-pending application Serial No. 868,286.

The present invention relates particularly to a novel means for spraying the interior of the pockets with an unctuous liquid, after the dough has been discharged and before the return of the pockets to filling position. As shown particularly in Fig. 2, the scraper L is located on the side of the cylinder E substantially opposite to the compression or feeding chamber B, and is provided with an incline $l$ terminating in an edge $l'$ which scrapes against the wall of the cylinder and directs the discharging dough down over the incline just after the dough has been discharged from a pocket $e'$; the pocket $e$ has been moved into registry with compression chamber B, and the outer entrance to pocket $e'$ is covered by the head $l^2$ of the scraper L. Said head is provided with a curved face $l^3$ which engages the outer wall of cylinder E. Within the head $l^2$ is a duct $m$ communicating at one end with a pocket $e'$, and at the other end with the atmosphere, it being understood that said duct $m$ extends transversely through said body portion. Communicating with duct $m$ is a supply pipe $m'$, which leads from a source of supply M, containing an unctuous liquid, preferably melted lard or a vegetable oil.

When the cylinder is at rest with pocket $e$ in registry with compression chamber B and opposite pocket $e'$ covered by scraper head $l^2$, the dough advanced by the forward stroke of plunger C retracts plunger K and fills pocket $e$. The retracting movement of plunger K retracts the other plunger K in pocket $e'$, from which pocket the dough has just been discharged above the incline $l$. As the plunger in pocket $e'$ retracts, a suction is created which draws air through duct $m$ and the unctuous liquid through communicating supply duct $m'$, the air and liquid commingling and being drawn by the suction of the retracting plunger, in the form of a fine spray, into the interior of the pocket $e'$, thereby depositing a thin film of lubricant on the inner walls of the pocket.

The above described arrangement is exceedingly simple and capable of attachment with many types of dough dividers without any change or shifting of the parts, since it is not dependent upon the mechanical manipulation of valves and the like. At the same time, the interior of the pockets are thoroughly sprayed with lubricant before their return to filling position, thereby preventing sticking of the dough to the inner walls of the pockets.

What is claimed is:

1. In combination, a head having measuring pockets therein movable into and out of filling position, means for feeding dough to the measuring pockets when in filling position and plungers movable in the pockets for discharging the dough therefrom, means for retracting the plungers after the dough is discharged, and means operated by suction of the retracting plungers for spraying the interior of the pockets preliminary to their return to filling position.

2. In combination, a head having measuring pockets therein movable into and out of filling position, means for feeding dough to the measuring pockets when in filling position and plungers movable in the pockets for discharging the dough therefrom, means for retracting the plungers after the dough is discharged, and means operated by suction of the retracting plungers for injecting an unctuous liquid into the interior of the pockets.

3. In a spraying apparatus for dough dividers and the like, the combination of a head having dough receiving pockets oppositely disposed to each other, plungers in the pockets for discharging the dough therefrom, means for simultaneously moving a pocket into filling position and an oppositely disposed pocket into spraying position, means for retracting simultaneously the plungers of the oppositely disposed pockets when in their respective filling and spraying positions, and means operated by suction of a retracting plunger for spraying the interior of a pocket when it is in spraying position.

4. In combination, a rotary head having oppositely disposed measuring pockets therein, a compression chamber with which the pockets are successively brought into registry for filling, a plunger for advancing the dough in the compression chamber, plungers in the oppositely disposed pockets, and connections intermediate said plungers whereby they may be moved simultaneously in opposite directions, a scraper arranged on the opposite side of the head from the compression chamber, said scraper covering a pocket when its plunger is retracted, an unctuous liquid supply, a duct in the scraper communicating with said unctuous liquid supply, and an air inlet communicating with said duct whereby a retracting plunger draws a spray of air saturated with oil into the interior of the pocket.

5. In combination, a head having dough receiving pockets oppositely disposed to each other, plungers in the pockets for discharging the dough therefrom, means for simultaneously moving a pocket into filling position and an oppositely disposed pocket into spraying position, means for retracting simultaneously the plungers of the oppositely disposed pockets when in their respective filling and spraying positions, a scraper covering a pocket in spraying position, an unctuous liquid supply, a duct in the scraper communicating with said unctuous liquid supply, and an air inlet communicating with said duct whereby a retracting plunger draws a spray of air saturated with oil into the pocket.

FRANK H. VAN HOUTEN, Jr.

Copies of this patent may be obtained for five cents each, by addressing the "Commissioner of Patents, Washington, D. C."